(12) United States Patent
Miyazaki

(10) Patent No.: US 8,746,102 B2
(45) Date of Patent: Jun. 10, 2014

(54) BALL SCREW DEVICE

(75) Inventor: Kazunari Miyazaki, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/202,934

(22) PCT Filed: Aug. 3, 2011

(86) PCT No.: PCT/JP2011/004405
§ 371 (c)(1),
(2), (4) Date: Aug. 23, 2011

(87) PCT Pub. No.: WO2012/081143
PCT Pub. Date: Jun. 21, 2012

(65) Prior Publication Data
US 2013/0255420 A1 Oct. 3, 2013

(30) Foreign Application Priority Data

Dec. 14, 2010 (JP) ................. 2010-278436

(51) Int. Cl.
*F16H 1/24* (2006.01)
*F16H 55/02* (2006.01)

(52) U.S. Cl.
USPC ....................................... 74/424.86

(58) Field of Classification Search
USPC ................. 74/424.82, 424.83, 424.86, 424.87
See application file for complete search history.

(56) References Cited

U.S. PATENT DOCUMENTS

| 2,851,897 | A | | 9/1958 | Cochrane | |
|---|---|---|---|---|---|
| 5,063,809 | A | * | 11/1991 | Schlenker | 74/424.86 |
| 6,874,939 | B2 | * | 4/2005 | Michioka et al. | 384/45 |
| 2002/0023513 | A1 | * | 2/2002 | Sekiya et al. | 74/424.87 |
| 2013/0139629 | A1 | * | 6/2013 | Kawai et al. | 74/424.86 |

FOREIGN PATENT DOCUMENTS

| JP | 47-25418 Y | 8/1972 |
|---|---|---|
| JP | 57-181956 U | 11/1982 |
| JP | 2006-125578 A | 5/2006 |

OTHER PUBLICATIONS

International Preliminary Report on Patentability (PCT/IB/373) dated Jun. 18, 2013, including English translation of Document C2 (Written Opinion (PCT/ISA/237)) previously filed on Jan. 25, 2012 (four (4) pages).
English-language translation of the International Search Report dated Sep. 20, 2011 (One (1) page).
International Search Report (PCT/ISA/210) dated Sep. 20, 2011 (one (1) page).
International Preliminary Report on Patentability (PCT/ISA/237) dated Sep. 7, 2011 (three (3) pages).

* cited by examiner

*Primary Examiner* — Justin Krause
(74) *Attorney, Agent, or Firm* — Crowell & Moring LLP

(57) ABSTRACT

A ball screw device for reducing damage to a circulating part even during a high speed operation is provided. To this end, the circulating part includes a pair of legs having a tang to scoop up a ball in a direction substantially match with a tangential direction of a spiral path, and a body to connect the pair of legs, wherein a center path diameter $Rb$ of the ball, an internal diameter $Rn$ of the nut, and an internal diameter $Rt$ opposite to the tang satisfy a relationship of $Rb \leq Rt \leq Rn$.

2 Claims, 4 Drawing Sheets

BALL SCREW DEVICE

TECHNICAL FIELD

The present invention relates to a ball screw device use e.g. for in a variety of machineries such as a machine tool or an injection molding machine, in particular, to a ball screw device with a tubular circulating part.

BACKGROUND ART

As a conventional ball screw device, there has been disclosed a ball screw device which is described in Patent Document 1. The ball screw device disclosed in Patent Document 1 is disposed so as to divide a resin circulating part (not shown) into two, and to substantially match (substantially match with a tangential direction of spiral path) with a centerline of the circulating route in a circulation route in a leg of the circulating part fit into a circulation hole of a nut with a tangential direction and with a lead angle direction of both screw grooves, to realize smooth scooping of a ball (rolling element).

However, the ball screw device disclosed in Patent Document 1, there is fear that because the circular part is divided into two in a radial direction along a centerline of a ball circulation route, which might fall into a situation where a tang for scoping up the ball is also divided, which might induce deterioration of strength of the tang.

To avoid the deterioration of the strength due to such division of the tang, there has been disclosed the ball screw device as disclosed in Patent Document 2.

FIG. 5 is a perspective view showing a divided body of the circulating part of the conventional ball screw device described in Patent Document 2. FIG. 5A is a perspective view viewing the divided body from one direction. FIG. 5B is a perspective view viewing the divided body from the other direction opposite to that shown in FIG. 5A.

As shown in FIGS. 5A and 5B, the circulating part 140 of the ball screw device disclosed in Patent Document 2 is composed of two divided bodies 140a,140a point symmetrically divided into two along a route direction of the ball circulation route R. That is, the two divided bodies 140a,140a are coupled with each other at divided surfaces A,B,C on which a circular groove 143 is formed for constructing the ball circulating route R, for constructing the circulating part 140. Each divided body 140a,140a respectively have a pair of legs 141, 141 and a body 142 to connect the pair of legs 141,141.

These pair of legs 141,141 are fit into a pair of circular holes (not shown) drilled in a direction substantially orthogonal to an axle line of a nut in the ball screw device, so as to communicate with a spiral path formed by a screw groove of a screw shaft and a screw groove of the nut of the ball screw device. At an end of one leg 141 out of the pair of the legs 141,141 of the divided body 140a, a tang 144 is provided to scoop up a ball rolling in the spiral path K in a direction substantially match with a tangential direction of the spiral path. Further, at an end of the other leg 141 (the leg 141 at which the tang 144 is not provided) out of the pair of the lags 141,141 of the divided body 140a, a relief 145 is provided to prevent contact with a screw shaft (not shown).

Patent Document 1: U.S. Pat. No. 2,851,897 A
Patent Document 2: JP 2006-125578 A

SUMMARY OF THE INVENTION

Problem to be Solved

However, since the circulating part disclosed in Patent Document 2 is divided at a surface substantially orthogonal to the ball circulating route R, a divided surface opposite to the tang projects from the nut, in the vicinity of an exit and entry of the ball of the circulating part in an inner peripheral surface of the nut. The projection of the circulating part should be allowed to a certain amount, for the purpose of holding of the ball and preventing damage to the nut resulting from collision of the balls. Nonetheless, when the projection of the circulating part is too much, it may be damaged during a high speed operation due to a repeated load originated in arrangement of the ball in a staggered state in the ball circulation route R, for lack of backup by the nut.

Thus, the present invention is made focusing on the above-mentioned problem and its objective is to provide a ball screw device to reduce damage to a circulating part even during a high speed operation.

Solution to the Problem

In order to solve the aforementioned problem, a ball screw device of an embodiment of the present invention comprises a screw shaft having a spiral groove in an outer peripheral surface, a nut having a spiral screw groove in its inner peripheral surface corresponding to the screw groove of the screw shaft and to be screwed with the screw shaft, a number of balls rotatably loaded into a spiral path between the screw grooves, and a circulating part to guide the ball rolling in the spiral path from one circulation hole of a pair of circulation holes drilled on a side in a radial direction of the nut in a direction substantially orthogonal to an axle line of the nut to the outside of the nut, in which both ends of the circulating part fit into each circulation hole in order to form a ball circulation route inside to return back the ball from the other circulation hole to the spiral path, wherein the both ends of the circulating part is fit into the circular hole of the nut, and comprises a pair of legs having a tang on each end to scoop up the ball rolling in the spiral path in a direction substantially orthogonal to a tangential direction of the spiral path, and a body to connect the pair of the legs, and wherein a center path diameter Rb of the ball, an internal diameter Rn of the nut, and an internal diameter Rt opposite to the tang satisfies an equation (1):

$$Rb \leq Rt \leq Rn \qquad \text{equation (1)}$$

Further, a surface formed in the internal diameter Rt opposite to the tang can be an arc. In addition, at least a surface of the ball circulation route side is arc, it needs not for the whole surface of the surface to be arc.

Advantageous Effect of the Invention

According to the ball screw device of an embodiment of the present invention, since the projection from the internal diameter of the nut having an internal diameter Rt can be appropriate, the invention can provide a ball screw device being able to reduce damage to the circulating part even during a high speed operation.

BRIEF DESCRIPTION OF THE DRAWINGS

FIG. 5 is a perspective view showing the divided body of the circulating part of the conventional ball screw device.

DESCRIPTION OF EMBODIMENTS

Hereinafter, a description will be made to an embodiment of a ball screw device with reference to the attached drawings.

Figure 1:
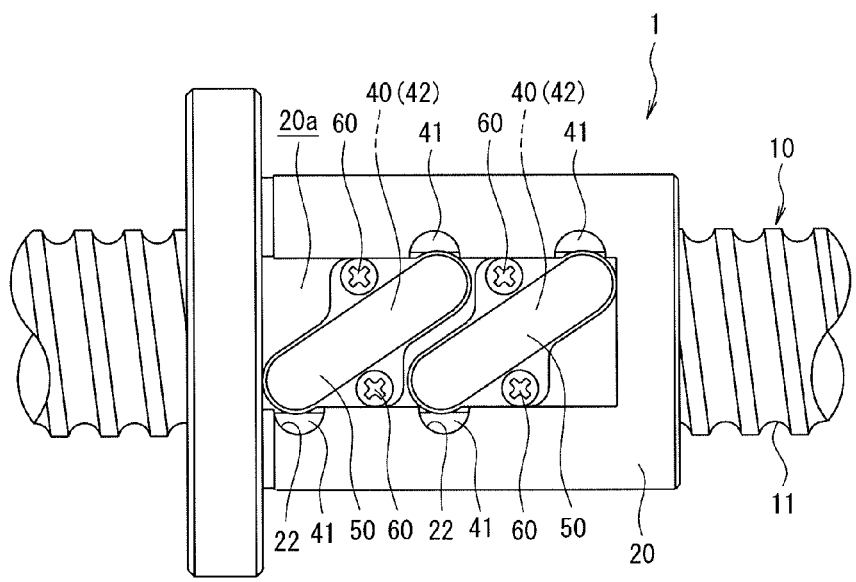
FIG. 1 is a plan view in an embodiment of the ball screw device.
Figure 2:
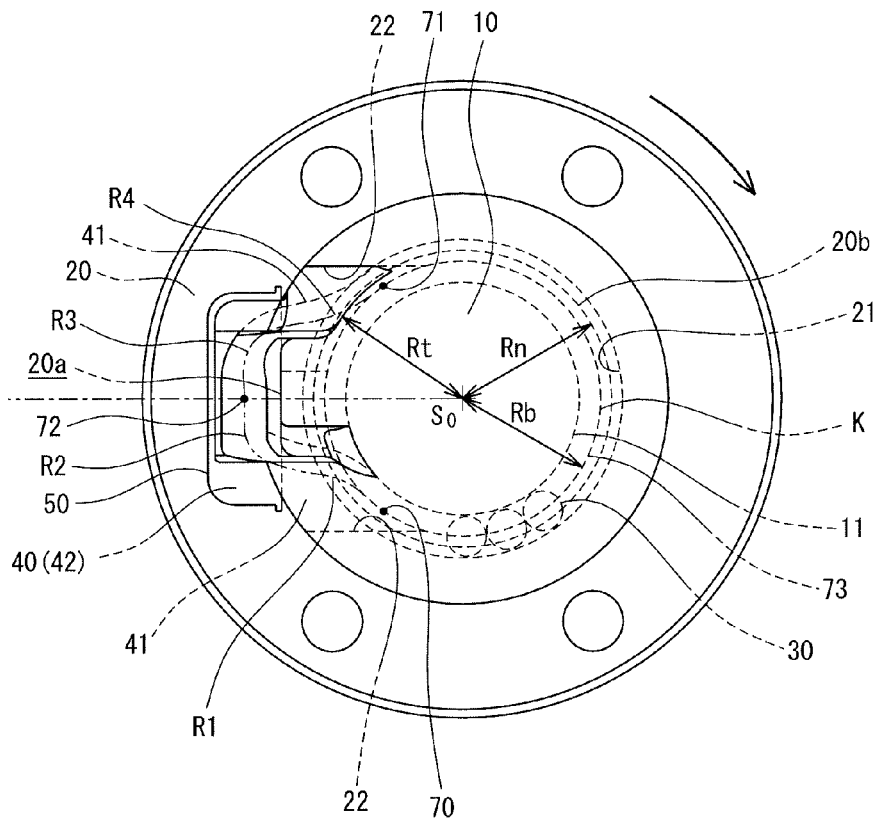
FIG. 2 is a right side view of FIG. 1.
Figure 3A:
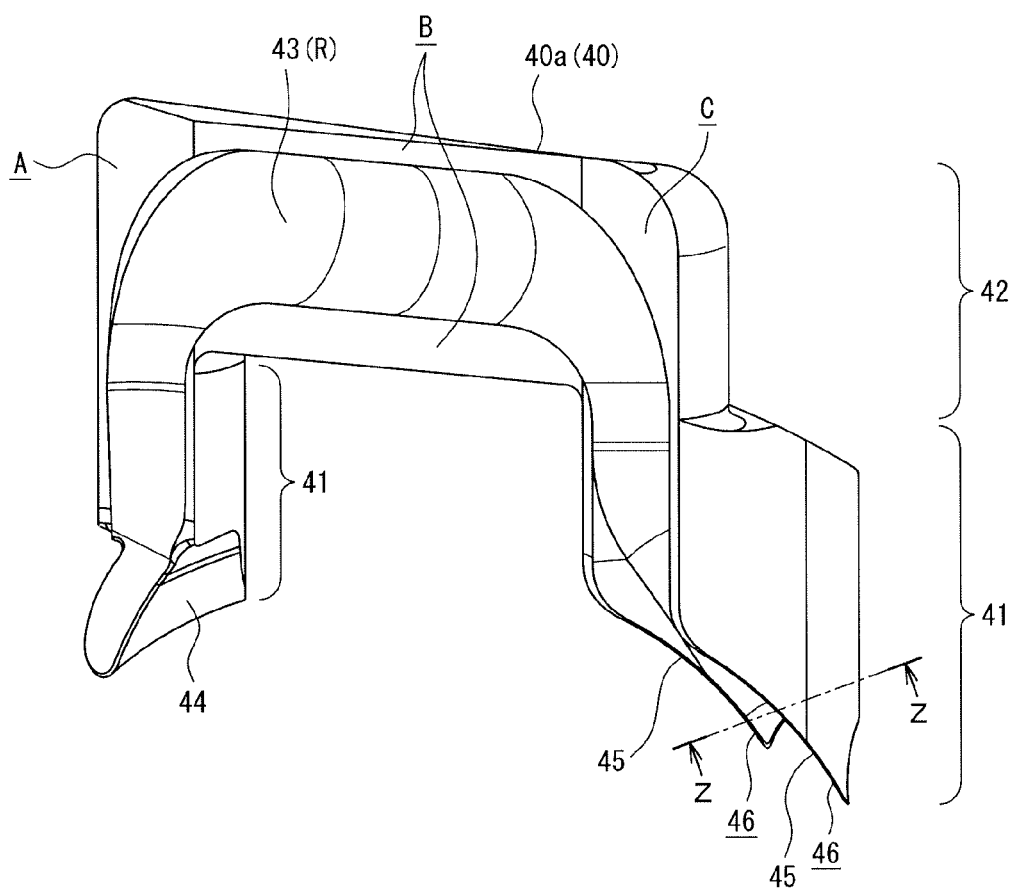
FIG. 3A is perspective view showing a divided body of the circulating part in the embodiment of the ball screw device.
Figure 3B:
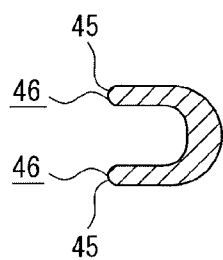
FIG. 3B is a cross-sectional arrow view taken along a line Z-Z of FIG. 3A.
Figure 4:
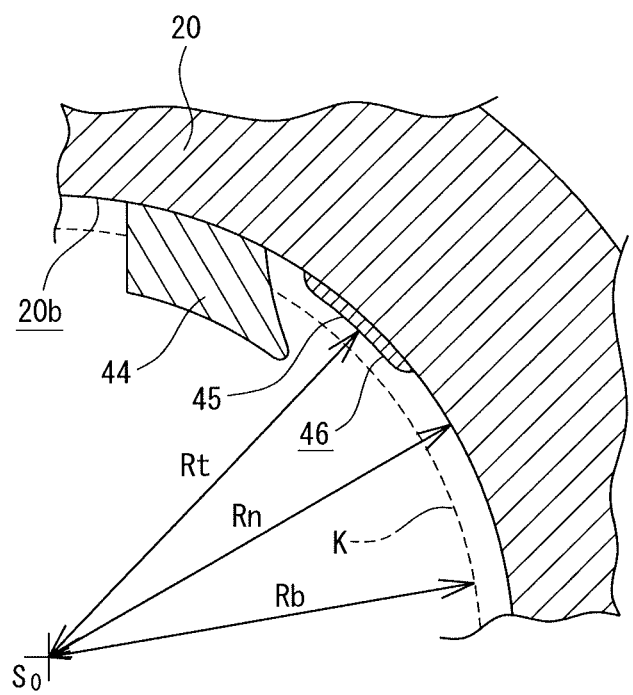
FIG. 4 is a cross-sectional view showing a positional relationship between the nut and the circulating part in an embodiment of the ball screw device.
Figure 5A:
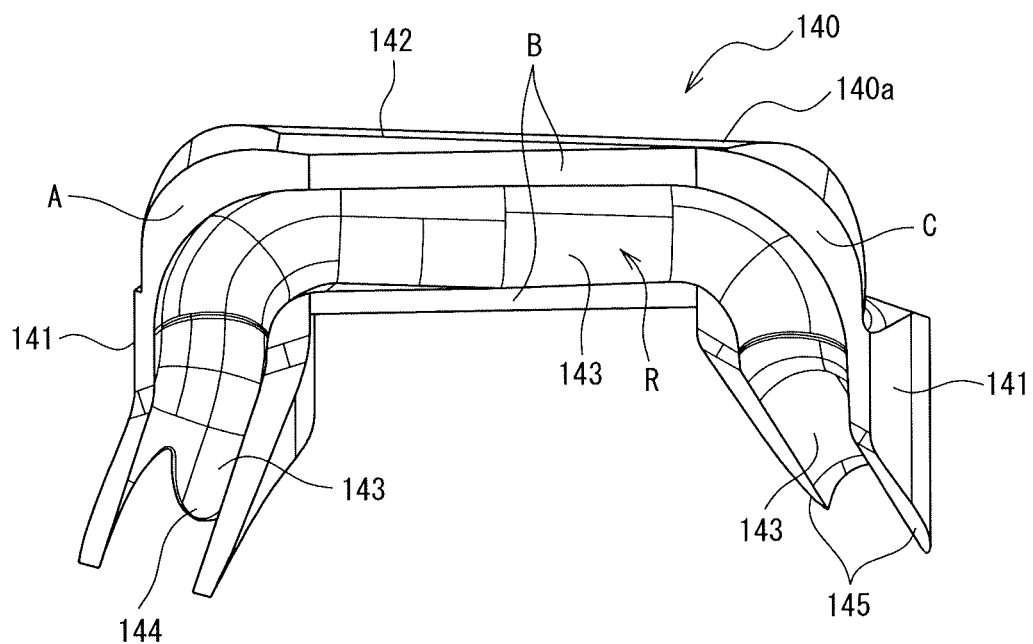
FIG. 5A is a perspective view seen from one direction of the divided body.
Figure 5B:
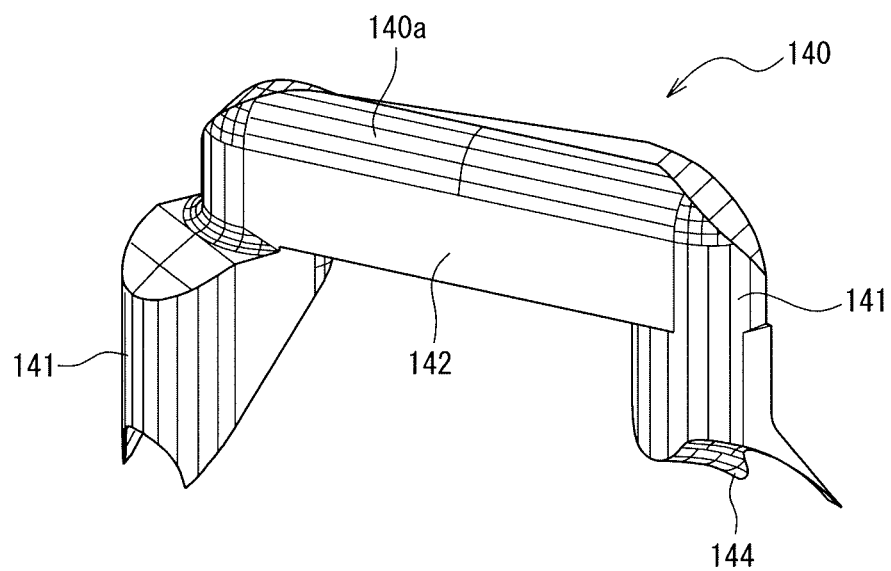
FIG. 5B is a perspective view seen from the other direction opposite to that of FIG. 5A at the divided body.

FIG. 1 is a plan view of an embodiment of the ball screw device. FIG. 2 is a right side view of FIG. 1. FIG. 3A is a perspective view showing a divided body of a circulating part in the embodiment of the ball screw device. FIG. 3B is a cross-sectional arrow view taken along a line Z-Z of FIG. 3A. FIG. 4 is a cross-sectional view showing a positional relationship between a nut and a circulating part in an embodiment of the ball screw device.

<Structure of Ball Screw Device>

As shown in FIG. 1 and FIG. 2, in the ball screw device 1, a nut 20 having in its inner peripheral surface a spiral screw shaft 21 corresponding to a screw groove 11, is fit into a screw shaft 10 having a spiral screw groove 11 on outer peripheral surface. The screw groove 21 of the nut 20 and the screw groove 11 of the screw shaft 10 are opposed to each other to form a spiral path K in which load is applied to the both grooves.

A number of balls 30 as a rolling element are rotatably loaded in the spiral path K. It is configured that rotating the screw shaft 10 or the nut 20 moves the nut 20 or the screw shaft 10 in an axial direction via rolling of the ball 30.

At a part of a peripheral surface of the nut 20, a flat part 20a is formed and a circulating part 40 is fixed by a locking screw 60 e.g. to the flat part 20a through a clamp 50.

As shown in FIG. 3A, the circulating part 40 is composed of two divided bodies 40a,40a point symmetrically divided into two along a route direction of the ball circulating route R. In the other words, the two divided bodies 40a,40a are coupled to each other at divided surfaces A,B,C on which a circulation groove 43 forming the ball circulation route R is respectively formed to construct the circulating part 40. Further, each divided bodies 40a,40a has a pair of legs 41,41 and a body 42 to connect the pair of legs 41,41.

This enables easy assembly of the circulating part 40 by joining two divided bodies 40a having the same shape at the divided surfaces A,B,C as well as reducing the cost as a forming die of the divided body 40a could do with one sort. In the instant embodiment, two circulating parts 40 are arranged to form two circulation routes R.

The pair of the legs 41 are spaced apart from each other in an axial direction of the screw shaft 10 and are arranged spaced apart from each other in a radial direction of the screw shaft 10. At an end of each leg 41, a tang 44 to scoop up the ball 30 rolling along a spiral path between the screw grooves 11,21 in a direction substantially match with a tangential direction of the spiral path, is provided.

As shown in FIG. 2, these pair of the legs 41,41 are fit into a pair of circular holes 22 drilled in a direction substantially orthogonal to an axle line on a flat surface 20a of the nut 20 communicating with a spiral path K between the screw grooves 11,21. The pair of the circular holes 22 are arranged with its centerline being apart from that of the screw shaft 10 by the same dimension in an opposite direction from each other. Here, at an end of the leg 41 at a side where the tang 44 of the divided body 40a is not provided, a relief 45 (see FIG. 3A) is formed so as not to contact with the screw shaft 10.

An continuously circulating path of the ball is made by the circulating part 40, which scoops up the ball 30 rolling along the spiral path K between the screw grooves 11,21 from one leg 41 for guiding the ball 30 to inside of the body 42 outside of the nut 20, and to return the ball 30 from the other lag 41 to the spiral path K.

Further, as shown in FIG. 2, the ball circulation route R in the circulating part 40 includes a first bend R1 for guiding the ball 30 scooped up from the spiral path K by the tang 44 of the one leg 41 of the pair of the legs 41,41 in a direction outside of the nut 20 and the direction substantially match or a preset angle relative to an axle line direction of the circular hole 22, a second bend R2 for guiding the ball 20 passed through the first bend R1 in a direction to the other leg 41, a third bend R3 for guiding the ball 30 passed through the second bend R2 to the inside of the leg 41 via the body 42, and a fourth bend R4 for guiding the ball 30 passed through the third bend R3 to a position of the tang 44 of the other leg 41.

Further, the circulating part 40 is point symmetrically divided into two along a route direction of the ball circulation route R at a position away from each tang 44 of the pair of the legs 41. Specifically, as shown in FIG. 3A, the first divided surfaces A and C dividing the leg 41 in a divided surface of the circulating part 40 (a divided body 40a) are divided so as to substantially orthogonal to a surface (a surface containing a group of normal vectors of a centerline of the ball circulation route R in the respective bends: a surface along to the plane of paper as shown in FIG. 2) containing a centerline of the ball circulation route R in the first bend R1 and the fourth bend R4. In addition, the second divided surface B dividing the body 42 in a divided surface of the circulating part 40(divided body 40a) is divided so as to substantially orthogonal to a surface (a surface containing a group of nominal vectors of the centerline of the ball circulation route R in the second bend R2 and the third bend R3: a surface along a page space in FIG. 2) containing a centerline of the ball circulation route R of the second bend R2 and the third bend R3. Herein, "the centerline of the ball circulation route R" is a trajectory line of the center (a ball center path 73 in FIG. 2) of the ball 30 in the ball circulation route R.

As shown in FIG. 4, a center path diameter Rb of the ball 30, an internal diameter Rn of the nut 20, and an internal diameter Rt opposite to the tang 44, of the circulating part 40 of ball screw device of the instant embodiment satisfy an equation (1):

$$Rb \leq Rt \leq Rn \quad \text{equation (1)}$$

The center path diameter Rb of the ball 30 is a distance from the center of a rotational axis S0 of the ball shaft 10 to a trajectory line of the center (a ball center path 73 of the ball in FIG. 2) of each ball 30 in the ball circulation route R. Further, the inner diameter Rn of the nut 20 is a distance from the center of the rotational axis S0 of the screw shaft 10 to the inner peripheral surface 20b (see FIG. 2) of the nut 20. Furthermore, the inner diameter Rt opposite to the tang 44 is a distance from the center of rotational axis S0 of the screw shaft 10 to a curved inner surface 46 (see FIG. 3A) of the circular groove 43 which restricts the ball 30 at opposite side of the tang 44 in the leg 41. The inner surface 46 is i.e. a surface opposite to the tang 44 of the other divided body 40a, in the circular groove 43 in the leg 41 of the one divided body 40a.

As shown in FIG. 3B, a cross-sectional shape of an inner surface of the tang 46 (a surface formed with an inner diameter Rt opposite to the tang 44) of the relief 45 may be arc (curved surface shape). Note that as long as at least surface at the ball circulation route R is arc, the whole surfaces of the inner surface 46 needs not to be arc. In this way, the formation of the cross-sectional shape of the inner surface 46 exerts an effect of preventing generation of stress concentration when the ball is collided with the relief 45, because of devoid of angular portions in the inner surface 46, compared with the case where the cross-sectional shape of the inner surface 46 is a plane. As a result, more improved effect to reduce damage to a circulating part during a high speed operation may be attained.

An explanation will be made a movement of the ball in the ball circulation route R in the instant embodiment referring to FIGS. 2, 3A and 3B. In FIG. 2, a reference numeral 70 denotes a ball scooping up position of the one leg, a reference numeral 71 denotes a ball scooping up position of the other leg, a reference numeral 72 denotes a midpoint of the ball circulation route R, a reference numeral 73 denotes a center path of the ball in the ball circulation route, and K denotes a trajectory line of the center path of the ball in the spiral path (loaded region). Here, in the case where the ball 30 is scooped up at the one leg side 41, the ball scooping up position 71 functions as a ball returning position. Meanwhile, in the case where the ball 30 is scooped up at the other leg side 41, the ball scooping up position 70 functions as a ball retuning position. Hereafter, an explanation will be made by giving an example where the ball 30 is scooped up at one leg side 41.

First, as shown in FIG. 2, an explanation will be made following a progress of the ball 30 in the ball circulation route R in the circulating part 40. Herein, as shown in FIG. 2, the ball shaft 10 shall be rotated clockwise in the arrow view from an axial direction.

The ball 30 rolling between the screw grooves 11,21 in the spiral path that is a loaded region is scooped up in a substantially tangential direction to the spiral path by the tang 44 at the ball scooping up position 70 of the one leg 41, resulting in running off the spiral path, and enters in the ball circulation route R.

The ball 30 entered from the ball scooping up position 70 to the ball circulation route R changes its traveling direction to the substantially same direction as a tangential direction of the circular hole 22, i.e. to a direction of the body 42 of the circulating part 40 along the first bend R1 in the ball circulation route R.

The ball 30 traveling in a direction of the body 42 of the circulating part 40 through the first bend R1 changes its course to a direction of the other leg 41 by the second bend R2. Thereafter, the ball 30 reaches a midpoint 72 of the ball circulation route R through the ball circulation route R in the body 42 of the circulating part 40.

The circulation route extends from the midpoint 72 of the ball circulation route R to the third bend R3 and the fourth bend R4, further to the ball scooping up position 71 of the other leg 41 exhibits a point symmetry shape of the route extending from the one ball scooping up position 70 to the midpoint 72 of the ball circulation route R.

Thus, by satisfying the above equation (1), since an appropriate projection amount from the inner diameter of the nut having an inner diameter Rt is realized, a ball screw device capable of reducing damage to the circulating part even during a high speed operation is provided.

Although the circular hole 22 of the nut 20 may be a round hole, it is desirable in this case to be a hole which is larger in dimension than a width dimension of an oval or an elliptical shape as well as its longitudinal direction to be a direction substantially along the spiral path between the screw grooves 11,21.

The formation of such circular hole 22 enables preventing the circular hole 22 from being interfered with the screw groove 21 in the loaded region to which the circular hole 22 is adjacent, even in a ball screw device of which screw groove 21 is adjacent to each other, as with a ball screw device having a small lead or a multiple thread screw device.

The present invention is not limited to the above-mentioned embodiment, and the invention may properly be changed within the ranges not departing from the gist of the present invention.

For example, in the instant embodiment, while the circulating part 40 is fixed e.g. to flat surface 20a of the nut 20 via the clamp 50, the circulating part 40 may of course be directly fixed to the flat surface 20a of the nut 20 by means of the locking screw or others.

Besides, materials, the shape, the dimension, the form, the number, and the location and the like of the screw groove, the screw shaft, the nut, the ball, the circular hole, the ball circulation route, the circulating part, the tang, the leg, the body, the first bend, the second bend, the third bend, the fourth bend, and the like exemplified in the aforesaid embodiment are arbitrary, as long as it may achieve the present invention, and hence they are not limited to the above.

REFERENCE SIGNS LIST

1: ball screw device
10: screw shaft
11: screw groove
20: nut
21: screw groove
22: circular hole
30: ball
40: circulating part
41: leg
42: body
R: ball circulation route

The invention claimed is:

1. A ball screw device comprising a screw shaft having a spiral screw groove in an outer peripheral surface, a nut having a spiral screw groove in its inner peripheral surface corresponding to the spiral screw groove of the screw shaft and to be screwed with the screw shaft, a number of balls rotatably loaded into a spiral path between the spiral screw grooves, and a circulating part to guide the ball rolling in the spiral path from one circular hole of a pair of circular holes drilled on a side of the nut in a direction substantially orthogonal to an axle line of the nut to the outside of the nut, in which respective ends of the circulating part are fit into respective circular holes, in order to form a ball circulation route inside to return back the ball from the one circular hole to the other circular hole to the spiral path, wherein the circulating part comprises a pair of legs having a tang on each end to scoop up the ball rolling in the spiral path in a direction substantially orthogonal to a tangential direction of the spiral path, and a body to connect the pair of the legs, and wherein a center path diameter Rb of the ball, an internal diameter Rn of the nut, and a distance Rt between a rotational axis of the screw shaft and an inner surface formed inside one of the pair of legs, the inner surface being opposite to the tang of the one of the pair of the legs, satisfy an equation (1): $Rb \leq Rt < Rn$.

2. The ball screw device according to claim 1, wherein the inner surface has an arc shape.

* * * * *